United States Patent
Scouller et al.

(10) Patent No.: US 9,390,278 B2
(45) Date of Patent: Jul. 12, 2016

(54) SYSTEMS AND METHODS FOR CODE PROTECTION IN NON-VOLATILE MEMORY SYSTEMS

(75) Inventors: Ross S. Scouller, Austin, TX (US); Daniel L. Andre, Austin, TX (US); Jeffrey C. Cunningham, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 230 days.

(21) Appl. No.: 13/616,922

(22) Filed: Sep. 14, 2012

(65) Prior Publication Data

US 2014/0082257 A1    Mar. 20, 2014

(51) Int. Cl.
  *G06F 12/14*   (2006.01)
  *G06F 21/62*   (2013.01)
  *G06F 21/79*   (2013.01)

(52) U.S. Cl.
  CPC ........ *G06F 21/6218* (2013.01); *G06F 12/1466* (2013.01); *G06F 21/79* (2013.01); *G06F 12/1483* (2013.01)

(58) Field of Classification Search
  CPC .............................. G06F 12/1466; G06F 21/62
  See application file for complete search history.

(56) References Cited

U.S. PATENT DOCUMENTS

| | | | |
|---|---|---|---|
| 5,937,063 A | 8/1999 | Davis | |
| 6,711,675 B1 | 3/2004 | Spiegel et al. | |
| 7,562,360 B2 | 7/2009 | Tai et al. | |
| 7,716,470 B2 | 5/2010 | Stillerman et al. | |
| 7,774,596 B2 | 8/2010 | Flynn | |
| 7,987,351 B2 | 7/2011 | Dellow | |
| 2005/0071592 A1 | 3/2005 | DeCaro | |
| 2005/0114687 A1 | 5/2005 | Zimmer et al. | |
| 2008/0086780 A1 | 4/2008 | Chen et al. | |
| 2008/0189557 A1* | 8/2008 | Pipitone .................. | G06F 21/79 713/193 |
| 2009/0113155 A1* | 4/2009 | Beals ............................. | 711/164 |
| 2009/0172414 A1 | 7/2009 | Dahan et al. | |
| 2009/0222652 A1 | 9/2009 | Khan et al. | |
| 2009/0228711 A1 | 9/2009 | Lim | |
| 2009/0296933 A1 | 12/2009 | Akselrod et al. | |
| 2011/0035603 A1* | 2/2011 | Ziv et al. ........................ | 713/193 |
| 2011/0138487 A1* | 6/2011 | Cohen et al. ..................... | 726/32 |
| 2011/0153970 A1* | 6/2011 | Hediger et al. ............... | 711/163 |
| 2011/0258462 A1 | 10/2011 | Robertson et al. | |
| 2011/0289137 A1* | 11/2011 | Ittah et al. ...................... | 709/203 |

OTHER PUBLICATIONS

Peng, "On-Chip System Protection Basics for HCS08 Microcontrollers", Freescale Semiconductor, Document No. AN3305, 2007, 26 pgs.

* cited by examiner

*Primary Examiner* — Christian P Chace
*Assistant Examiner* — Leandro Villanueva

(57) ABSTRACT

Methods and systems are disclosed for code protection in non-volatile memory (NVM) systems. Information stored within NVM memory sectors, such as boot code or other code blocks, is protected using lockout codes and lockout keys written in program-once memory areas within the NVM systems. Further, lockout codes can be combined into a merged lockout code that can be stored in a merged protection register. The merged protection register is used to control write access to protected memory sectors. Lockout code/key pairs are written to the program-once area when a memory sector is protected. The program-once area, which stores the lockout code/key pairs, is not readable by external users. Once protected, a memory sector can not be updated without the lockout code/key pair.

22 Claims, 5 Drawing Sheets

SYSTEMS AND METHODS FOR CODE PROTECTION IN NON-VOLATILE MEMORY SYSTEMS

TECHNICAL FIELD

This technical field relates to non-volatile memory (NVM) systems and, more particularly, to protecting memory sectors within NVM systems.

BACKGROUND

Programmable memories have been implemented using non-volatile memory (NVM) cells. These programmable NVM systems can be implemented as stand-alone memory integrated circuits or can be embedded within other integrated circuits, as desired.

NVM systems can be used, for example, to store instructions, such as boot code and other code blocks, that are accessed and used by processing circuitry to perform various operations. Further, multiple code blocks may be programmed into a single NVM system by one or more vendors prior to the NVM system being received and used by an end user. Still further, updates to these code blocks can also be made by reprogramming the NVM system after an end user has already put the NVM system into use. Protection mechanisms are often provided within an NVM system to allow one vendor to prevent its code blocks from being accidentally or purposefully changed by another user and/or vendor.

FIG. 1 (Prior Art) is a block diagram of an embodiment 100 for an NVM system having a protection code 116 that is used to lock memory sectors within the NVM system 100. For the embodiment 100 depicted, the NVM system includes memory control circuitry 102 and NVM memory 110. The NVM memory 110 includes a read/write memory area 112 that has memory sectors that are readable and writable through read/write commands to the NVM system 100. This read/write memory area 112 further includes one or more protectable sectors 114 and one or more open sectors 118. The protectable sectors 114 are sectors for which write access is controlled using a protection code (PC) 116. The protection code (PC) 116 is stored within the protectable sectors 114 and is loaded within the protection register 106 at start-up or after reset of the NVM system 100. The NVM memory 110 also includes a program-once area 120 that is not readable through read commands to the NVM system 100. Memory trim parameters (TRIM) 122 are stored within the program-once area 120 by writes performed through the access control circuitry 104. The memory trim parameters (TRIM) 122 are used to adjust the operation of the NVM memory 110, for example, based upon post manufacturing test results.

The memory control circuitry 102 communicates with the NVM memory 110 to perform NVM operations using control signals (CNTL) 128, data signals (DATA) 126, and address signals (ADDR) 124. The memory control circuitry 102 communicates with other external circuitry through connections 132, which includes control signals (CNTL) 138, data signals (DATA) 136, and address signals (ADDR) 134. The memory control circuitry 102 also includes access control circuitry 104 and protection register 106. During operation, the access control circuitry 104 controls write access to the protectable sectors 114 within the NVM memory 110 using the contents of protection register 106. As indicated above, the protection register 106 is loaded with the protection code (PC) 116 during start-up and/or reset. This protection code (PC) 116, for example, can be a string of protection bits, with each protection bit being associated with one of the protectable sectors 114 (e.g., 32-bits with one protection bit associated with one of 32 different protectable sectors). If the protection bit for the protectable sector indicates that the sector is protected, the access control circuitry 104 will not allow write access to the sector. Alternatively, if the protection bit for a protectable sector indicates that the sector is not protected, the access control circuitry 104 will allow write access to the sector. The protection code 116 can be accessed and programmed by a user and/or circuitry external to the NVM system 100 using commands issued to the NVM system 100 through connections 132.

If the contents of the protection register 106 have been corrupted, either intentionally or unintentionally, the access control circuitry 104 may grant write access to the protected sector even if it was marked as protected. Existing protection schemes for NVM systems tend to work in normal run modes but can be disabled in certain test mode commands and/or with a generic backdoor key. These test mode commands and/or backdoor keys can often become generally known, thereby losing their effectiveness in limiting write access to protected code segments. Thus, the protection code 116 and/or the protection register 106 are subject to being intentionally or unintentionally corrupted, leading to possible corruption of the information stored within protected memory sectors, such as boot code and/or other code blocks.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale FIG. 1 (Prior Art) is a block diagram of an embodiment for a non-volatile memory (NVM) system having a protection code that is used to lock memory sectors within the NVM system.

DETAILED DESCRIPTION

Methods and systems are disclosed for code protection in non-volatile memory (NVM) systems. Information stored within NVM memory sectors, such as boot code or other code blocks, is protected using lockout codes and lockout keys written in program-once memory areas within the NVM systems. Further, lockout codes can be combined into a merged lockout code that can be stored in a merged protection register. The merged protection register is used to control write access to protected memory sectors. Lockout code/key pairs are written to the program-once area when a memory sector is protected. The program-once area, which stores the lockout code/key pairs, is not readable by external users. Once protected, a memory sector can not be updated without the lockout code/key pair. Different embodiments and variations can be implemented, as desired, and related or modified systems and method can be utilized, as well.

Code storage in non-volatile memory (NVM) devices, particularly FLASH devices, are often layered with application specific code by a number of different vendors prior to the NVM device being put into operation by an end user. As such, code programmed by a primary vendor, such as boot code or other code blocks, can be erased or modified intentionally or unintentionally by an intervening vendor. The described embodiments allow a block of code or other information written into an NVM system to be protected from future erasure or modification. Only a user, such as the originating vendor, who has the lockout code and the lockout key used to program the code or information within the protectable memory sectors is able to update the protected code or information.

Advantageously, the disclosed embodiments may overcome weaknesses with prior protection schemes by utilizing write-once areas of an NVM system to store the lockout code/key pairs that identify protected memory sectors. These write-once areas are also not readable by external users of the NVM system thereby further protecting the lockout code/key pairs that are required to update protected memory sectors. As such, protected memory sectors effectively operate as ROM (read only memory) areas to users that do not have the lockout code/key pair information for the protected sector. While program-once areas for NVM systems have been used in the past to store trim information and/or chip serial numbers, these program-once areas for NVM systems have not been used to hold lockout codes/keys that are used to protect memory sectors, as described herein. Further, multiple lockout codes and associated lockout keys can be written into the program-once area to allow layered information and code blocks to be stored and protected within memory sectors. This layered protection allows multiple different vendors to add and protect multiple different layered code blocks within the NVM system.

Figure 1:
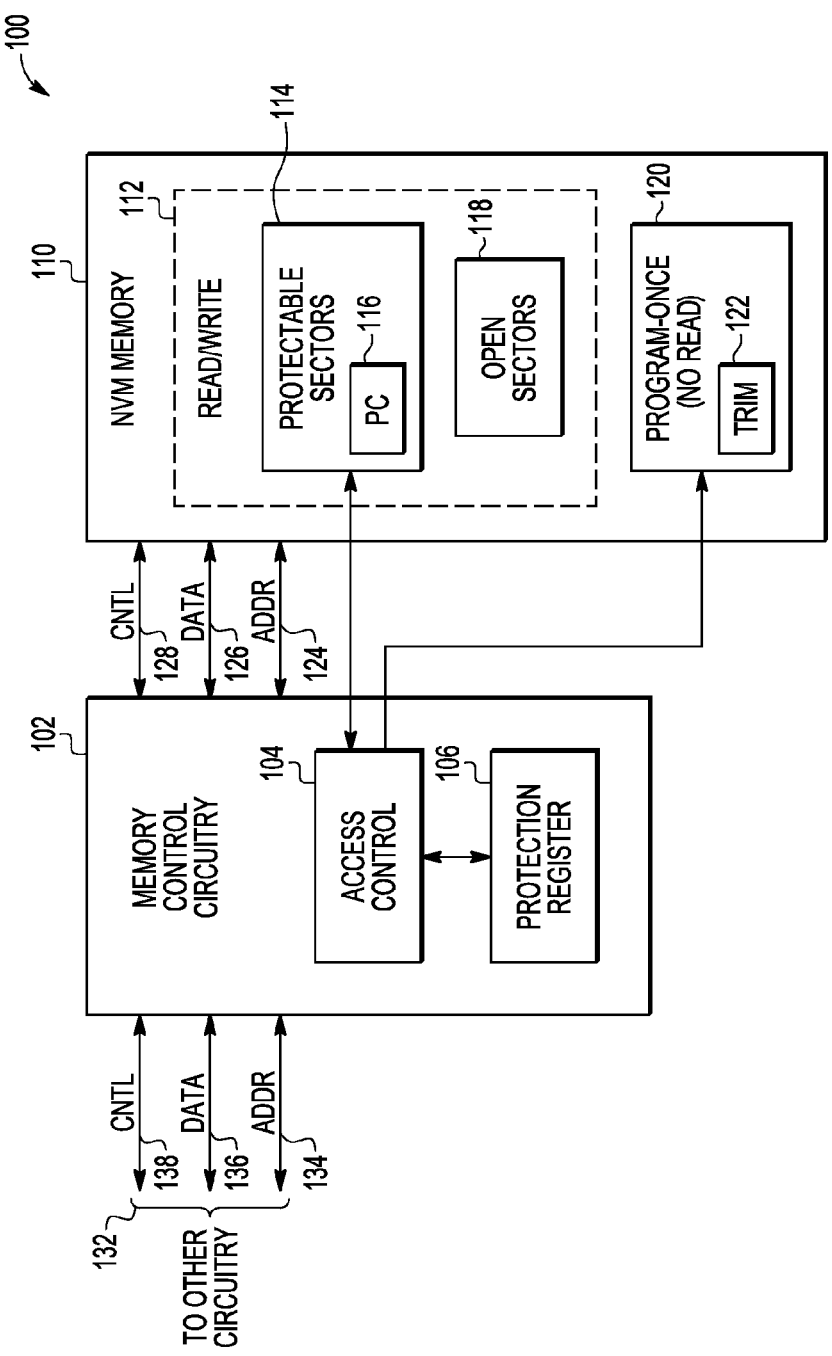
Figure 2:
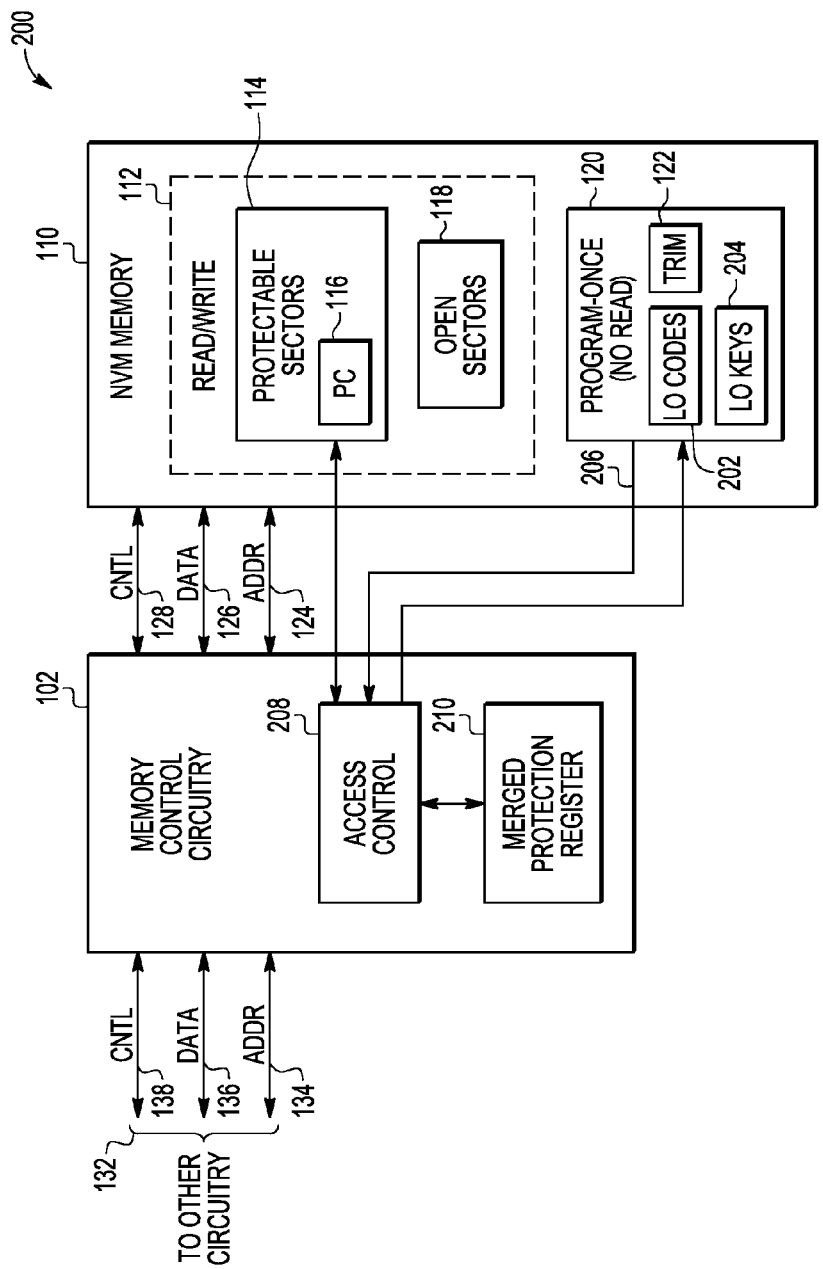
FIG. 2 is a block diagram of an embodiment for an NVM system having lockout codes and lockout keys that are stored in a non-readable program-once area for the NVM system and that are used to lock memory sectors within the NVM system.

FIG. 2 is a block diagram of an embodiment 200 for an NVM system having lockout (LO) codes 202 and lockout (LO) keys 204 that are used to lock memory sectors within the NVM system 200. NVM system 200 is similar to NVM system 100. In contrast with NVM system 100, however, the program-once area 120 for the NVM system 200 includes the lockout (LO) codes 202 and the lockout (LO) keys 204. In addition, the access control circuitry 208 is configured to combine the lockout (LO) codes 202 into a combine lockout code that is stored in a merged protection register 210. The access control circuitry 208 can also combine the protection code (PC) 116 with the lockout (LO) codes 202 and store this combined lockout code in the merged protection register 210. As described in further detail below, the access control circuitry 208 utilizes the merged protection register 210, along with the lockout (LO) codes 202 and lockout (LO) keys 204 to control access to protected sectors.

The LO codes 202 within the program-once section 120 can be written using commands issued to the NVM system 200 through the connections 132. When an LO code is written as one of the LO codes 202 for a new sector to be protected, an associated LO key is also written as one of the LO keys 204. The LO codes 202 are used to indicate which of the protectable sectors 114 have been protected. The LO keys 204 are used to further protect and control subsequent access to sectors that have been locked using LO keys 204. As described above, the program-once area 120 is not readable through commands issued to the NVM system 200 through connections 132.

During operation at start-up and/or upon reset, the access control circuitry 208 receives the protection code (PC) 116 from the protectable sectors 114 and the lockout (LO) codes 202 from the program-once area 120. The access control circuitry 208 then combines protection code 116 and the LO codes 202 and stores a merged protection code in the merged protection register 210. When a write access command is issued through connections 132, the access control circuitry 208 checks the merged protection register 210 to see if the sector being accessed is protected. If so, then write access is allowed only if a LO code/key pair received along with the write access request matches the LO code/key pair stored for that sector. As described herein, while the access control circuitry 208 accesses the lockout codes 202 and lockout keys 204, the lockout codes 202 and the lockout keys 204 are not readable by a user through commands issued to the NVM system 200 through the connections 132. Advantageously, therefore, the disclosed embodiments provide protectable memory sections 114 that effectively operate as ROM (read only memory) sections once they are protected using lockout code/key pairs 202/204 stored in non-readable write-once memory areas 120 of the NVM system 200.

It is noted that while the embodiments described herein assume that multiple lockout codes are being used, a single lockout code 202 could be used, if desired. Where multiple lockout codes are provided, then these lockout codes are merged together to form a merged protection code that is stored in a merged protection register. However, if desired, multiple protection registers could be utilized with each storing one or more lockout codes. Further, where a traditional protection code (PC) 116 is also used, this traditional protection code (PC) 116 can also be merged into the merged protection code, as well. It is again noted, however, that additional protection registers could be used with one storing the protection code (PC) 116 and others storing the lockout codes 202 described herein. If desired, the protection code 116 could be removed, such that only one or more lockout codes 202 are used. It is further noted that the protectable sectors 114 can be any desired section or area of memory. Further, the protectable sectors 114 can be any desired size and can be different sizes of memory, if desired. While the embodiments herein use one protection bit within the lockout codes 202 to protect each of the protectable sectors 114, multiple protection bits could also be used for each protectable sector, if desired.

Figure 3:
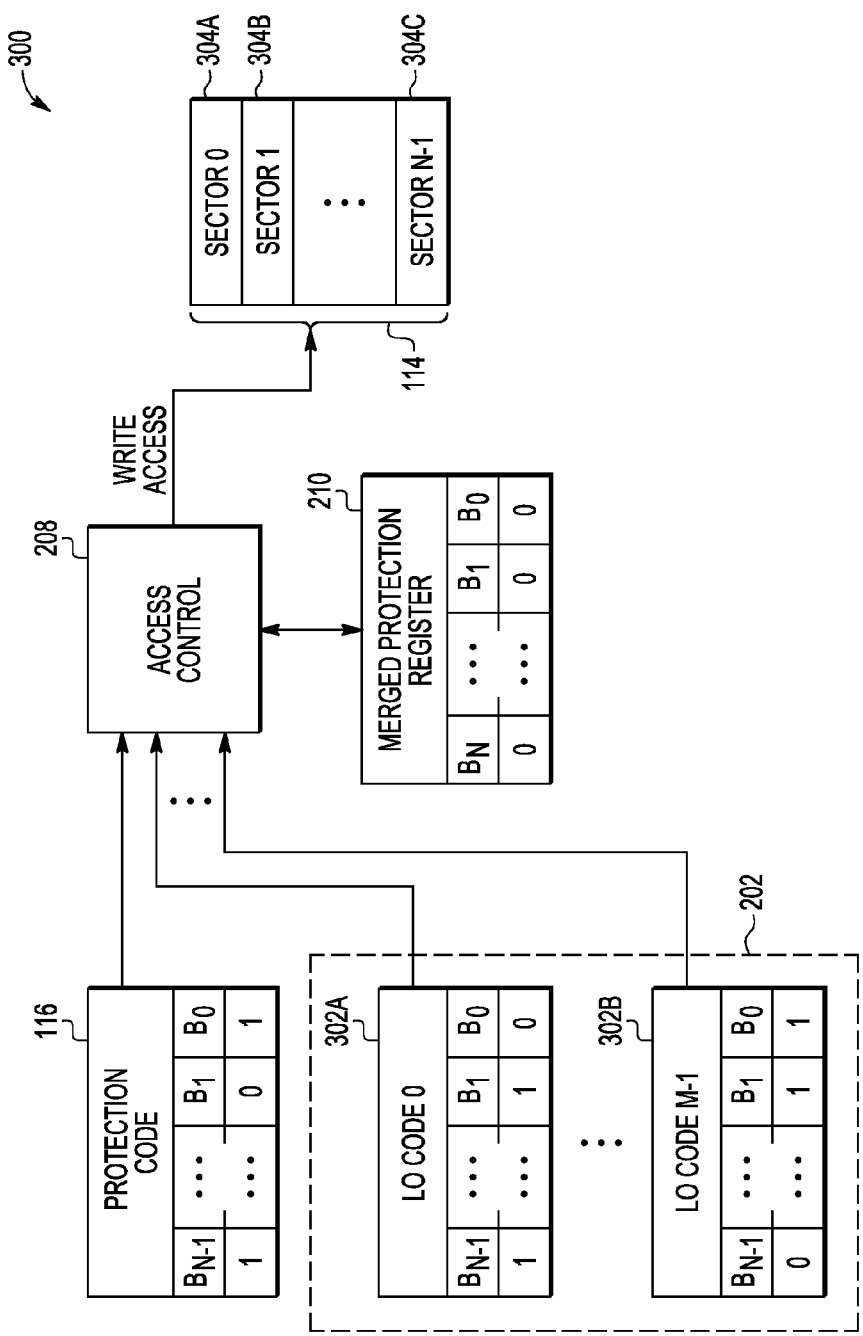
FIG. 3 is a block diagram of an embodiment where lockout codes and a protection code are combined to form a merged protection code.

FIG. 3 is a block diagram of an embodiment 300 where a protection code 116 is combined with lockout codes 202 to form a merged protection code. For the embodiment 300 depicted, the protection code 116 and the lockout codes 202 are N-bit codes. Each bit of each N-bit code corresponds to one of the protectable sectors 114. As such, there are N protectable sectors 114. Further, a "0" bit is used to indicate that the associated sector is protected. A "1" bit indicates that the sector has not been protected. The access control circuitry 208 combines the protection code 116 and the lockout codes 202, and the access control circuitry 208 stores the result in the merged protection register 210. The merged protection register is also N-bits. Further, for the embodiment 300 depicted, the lockout codes 202 include M different lockout codes from a first lockout code (LO code 0) 302A to an Mth lockout code (LO code M-1) 302B. The access control circuitry 208 uses the merged protection code stored in the merged protection register 210 to control write access to the N different protectable sectors 114 (SECTOR 0, SECTOR 1 . . . SECTOR N-1).

As depicted, the protection code 116 is an N-bit sequence including bits $B_{N-1} \ldots B_1, B_0$ having the logic values "1 . . .

01" where the "0" represents that the second sector (SECTOR 1) 304B is protected. The first lockout code (LO code 0) 302A is an N-bit sequence including bits $B_{N-1} \ldots B_1, B_0$ having the logic values "1 . . . 10" where the "0" represents that the first sector (SECTOR 0) 304A is protected. The last lockout code (LO code N-1) 302B is an N-bit sequence including bits $B_{N-1} \ldots B_1, B_0$ having the logic values "0 . . . 11" where the "0" represents that the last sector (SECTOR N-1) 304C is protected. The access control circuitry 208 combines the protection code 116 and the BL codes 202, for example, using an AND operation such that any "0" bit will result in a "0" in the corresponding bit within the merged protection register 210.

TABLE 1 provides a further example for combining a protection code 116 and seven lockout codes 202 (e.g., M=7) to provide a resulting merged code that is stored in the merged protection register 210 and used by the access control circuitry 208. The codes are 32-bit codes to represent 32 different protectable sectors ($S_{31}:S_0$). Each bit represents a protection bit ($B_X$) associated with a protectable sector ($S_X$). The hexadecimal representations for the binary codes are also included in parentheses. For this example in TABLE 1, it is also noted that the default bit values within the protection code and boot lockout codes are set to "1." When protection is desired for a sector, the protection bit for that sector is changed to a "0." These bit values could be swapped, if desired, and other techniques could also be used, if desired, for indicating whether or not a sector is protected.

TABLE 1

EXAMPLE MERGED PROTECTION CODE

| Code | Protection Bits ($B_{31}:B_0$) for Protectable Sectors ($S_{31}:S_0$) |
|---|---|
| Protection Code | 1111-1111-1111-1111-1111-1111-1111-1101 (FFFF-FFFD) |
| Lockout Code 0 | 1111-1111-1111-1111-1111-1111-1111-1110 (FFFF-FFFE) |
| Lockout Code 1 | 1111-1111-1111-1111-1111-1111-1110-0011 (FFFF-FFE3) |
| Lockout Code 2 | 1111-1111-1111-1111-1111-1111-1101-1111 (FFFF-FFDF) |
| Lockout Code 3 | 1111-1111-1111-1111-1001-1111-1111-1111 (FFFF-9FFF) |
| Lockout Code 4 | 0111-1111-1111-1111-1111-1111-1111-1111 (7FFF-FFFF) |
| Lockout Code 5 | 1111-1111-1111-1111-1111-1111-1111-1111 (FFFF-FFFF) |
| Lockout Code 6 | 1111-1111-1111-1111-1111-1111-1111-1111 (FFFF-FFFF) |
| Merged Code | 0111-1111-1111-1111-1001-1111-1100-0000 (7FFF-9FC0)) |

For TABLE 1 above, it is noted that the protection code indicates protection for Sector 1 by having "0" in protection bit $B_1$. Lockout Code 0 indicates protection for Sector 0 by having "0" in protection bit $B_0$. Lockout Code 1 indicates protection for Sectors 2-4 by having "0" in protection bits $B_2$, $B_3$, and $B_4$. Lockout Code 2 indicates protection for Sector 5 by having "0" in protection bit $B_5$. Lockout Code 3 indicates protection for Sectors 13 and 14 by having "0" in protection bit $B_{13}$ and $B_{14}$. Lockout Code 4 indicates protection for Sector 31 by having "0" in protection bit $B_{31}$. Lockout Code 5 and Lockout Code 6 have not yet been programmed to protect sectors, and all protection bits are still set to "1." The merged code, which is a combination of the other codes, indicates protection for all protected sectors (i.e., Sectors 0-5, 13-14 and 31) by having "0" in protection bits $B_0$-$B_5$, $B_{13}$-$B_{14}$, and $B_{31}$.

Further, for this example in TABLE 1, only one code will protect any given protectable sector, such that the same protection bit ($B_X$) will not be a "0" value in more than one code. In other words, the protection code and the lockout codes are configured not to have overlapping "0" values for any one protection bit. It is again noted that the lockout codes can be used without the protection code, if desired, such that the merged code is a combination only of lockout codes. Further, only one lockout code could be used, if desired, such that no merging of codes would be used. It is further noted that a copy of the merged lockout codes can be stored prior to any external access to the merged protection register 210, if desired, to prevent a change to the merged protection register 210 from occurring during access. Further, any command to the NVM system that does not use a standard command through connections 132, such as triggering an erase through an erase-all pin, can be configured to initiate a check of merged lockout codes prior to the non-standard command being allowed to proceed. Other techniques and/or modifications to the embodiments herein could also be implemented, as desired, to further protect desired sectors from being modified.

As described above, the lockout codes 202 are located within the program-once area 120 and can only be written once through commands sent to the NVM system 200. Further, while the boot lockout codes 202 can be accessed and used by the access control circuitry 208, the boot lockout codes 202 are not accessible or readable by other circuitry through commands communicated through the connections 132. As such, while the contents of the merged protection register 106 can be accessed by other circuitry, the boot lockout codes 202 can not be accessed.

The boot lockout keys 204 are also located within the program-once area 120 and can only be written once through commands sent to the NVM system 200. As described in more detail below, these boot lockout keys 204 are required to gain write access to sectors that have been protected using a boot lockout codes 202. As with the boot lockout codes 202, the boot lockout keys can be accessed and used by the access control circuitry 208. However, the boot lockout keys 204 are also not accessible or readable by other circuitry through commands communicated through the connections 132. As such, once written, the boot lockout keys 204 are only known to the user that wrote the lockout key into the program-once area 120.

During a protection request, a boot lockout (BL) code is written with one or more "0" values to protect one or more sectors. At the same time, a boot lockout (BL) key is also written and associated with the boot lockout (BL) code. TABLE 2 below provides an example for the code/key pairs that are stored within the program-once area 120. The boot lockout (BL) key can be any desired bit string. For example, a 32-bit key can be used. Shorter key lengths could also be used if desired. And longer key lengths, such as 128 bits or more, could be used if enhanced protection is desired.

TABLE 2

EXAMPLE LOCKOUT CODE/KEY PAIRS

| Lockout Code | Lockout Key |
|---|---|
| LO CODE 0 | LO KEY 0 |
| LO CODE 1 | LO KEY 1 |
| . . . | . . . |
| LO CODE N | LO KEY N |

Figure 4:
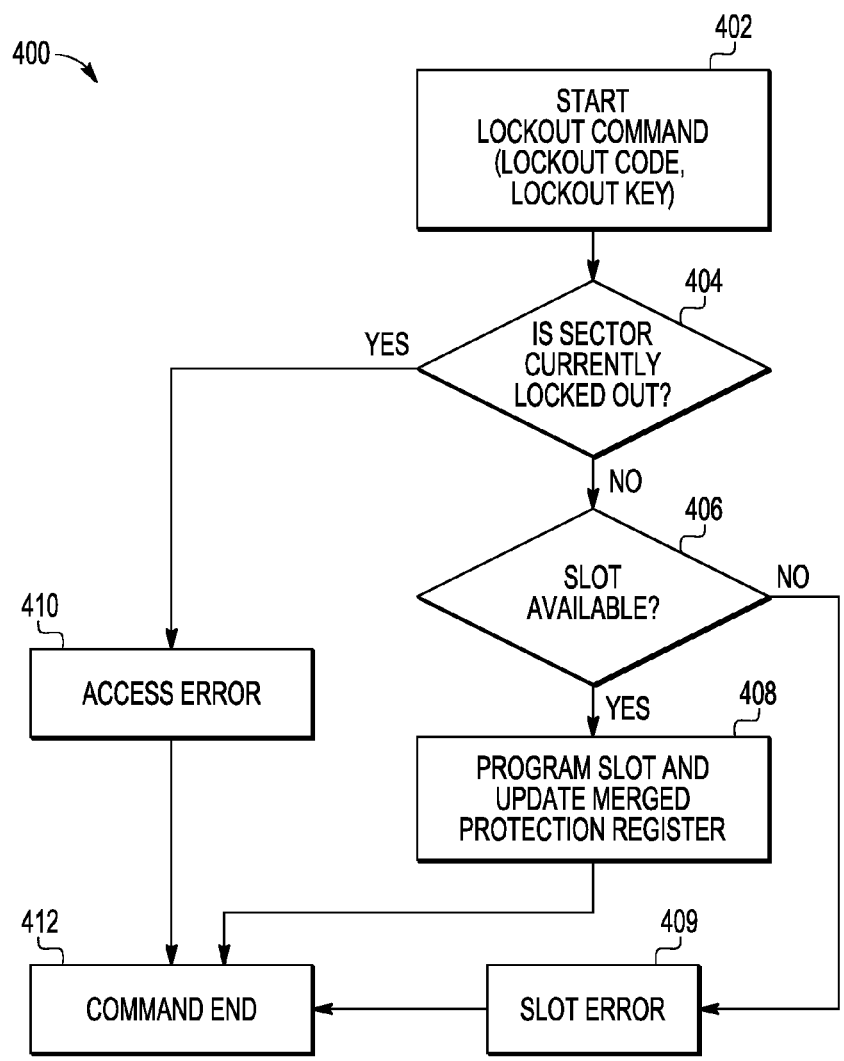
FIG. 4 is a flow diagram of a process embodiment for protecting a sector using a boot lockout code and a boot lockout key.

FIG. 4 is a flow diagram of an embodiment 400 for protecting a sector using a lockout code and a lockout key. In block 402, a lockout command for a sector within the protectable sectors 114 is started using communications to the NVM system 200 through connections 132. A lockout code and a lockout key for the sector being protected are communicated as part of this lockout command request. In decision block 404, a determination is made whether or not the sector is currently locked out. For example, the access control circuitry 208 can check the merged protection register 210 to see if the protection bit for the sector has already been set to indicate protection. If the determination in block 404 is "YES," then block 410 is reached where an access error is communicated in response to the lockout request. The lockout command then ends in block 412. If the determination in block 404 is "NO," then determination block 406 is reached where a determination is made whether or not an additional lockout code slot is available. If all lockout codes have already been written, then the determination in block 406 is "NO," and block 409 is reached where a slot error is communicated in response to the lockout request. The lockout command then ends in block 412. If a lockout code slot is available, then the determination in block 406 is "YES." Block 408 is then reached where the slot is programmed with the lockout code, and the lockout key associated with the lockout code is also programmed within the write-once area. In addition, the merged protection register is updated. The lockout command then ends in block 412. Write access to information within the memory sector, such as boot code or other code blocks, is now protected by the lockout code and lockout key that were stored for this protected sector.

After a lockout code has been used to protect a memory sector, the protected memory sector can be erased or updated only if an update command is presented that includes the lockout code and the lockout key that matches the lockout code/key pair stored in the write-once area that protects this protected sector. Without this lockout code/key pair, the protected memory sectors can not be modified.

Figure 5:
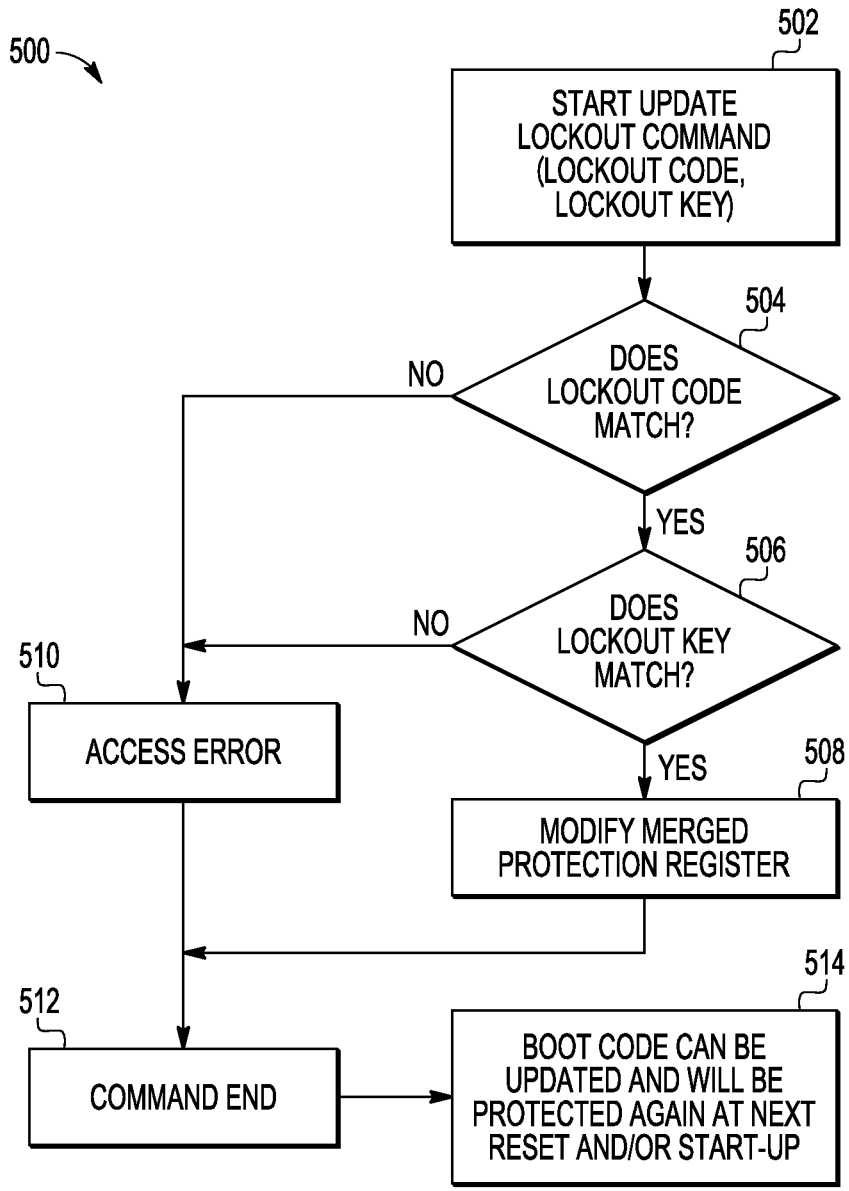
FIG. 5 is a flow diagram of a process embodiment for updating a protected sector using a boot lockout code and a boot lockout key.

FIG. 5 is a flow diagram of an embodiment 500 for updating a protected sector using a lockout code and a lockout key. In block 502, an update lockout command for a protected sector within the protectable sectors 114 is started using communications to the NVM system 200 through connections 132. A lockout code and a lockout key for the protected sector being updated are communicated as part of this update lockout command request. In determination block 504, a determination is made by the access control circuitry 208 whether or not the lockout code matches the lockout code that protects the protected sector being accessed. If the determination in block 504 is "NO," then block 510 is reached where an access error is communicated in response to the update request. The update lockout command then ends in block 512. If the determination in block 504 is "YES," then determination block 506 is reached where a determination is made by the access control circuitry 208 whether or not the lockout key matches the stored lockout key associated with the lockout code protecting the sector being accessed. If the determination in block 506 is "NO," then block 510 is again reached where an access error is communicated in response to the update request. If the determination in block 506 is "YES," then block 508 is reached where the access control circuitry 208 modifies the merged protection register 210 to unprotect the sector being updated, thereby allowing information within that sector to be updated. The update lockout command then ends in block 512. As shown in block 514, information within the sector, such as boot code or other code blocks for a processor, can be updated. Upon the next reset and/or start-up of the NVM system 200, the merged protection register 210 will again be set to protect the sector using the lockout code 202 stored within the write-once area 120.

It is again noted that, as described herein, that the lockout code and the lockout key are written within the program-once area 120 and that this program-once area 120 is not directly accessible to an external system. While the access control circuitry 208 accesses and uses the lockout codes 202 and lockout keys 204, only the merged protection code stored in the merged protection register 210 is accessible through commands issued to the NVM system 200 through the connections 132. This inability for subsequent vendors and/or users to determine the lockout code/key pair information significantly enhances protection of protectable sectors 114 as compared to prior solutions.

As described herein, a variety of embodiments can be implemented and different features and variations can be implemented, as desired.

In one system embodiment, a non-volatile memory (NVM) system includes at least one protectable memory sector having contents accessible through a read command to the NVM system, a program-once memory area having contents not accessible through a read command to the NVM system and being configured to store at least one lockout code and at least one lockout key associated with the lockout code where the at least one lockout code is configured to identify at least one protectable memory sector as a protected memory sector, and access control circuitry configured to receive a write access request for a protected memory sector and to allow write access to the protected memory sector only if a lockout code and a lockout key are received with the write access request that match a lockout code and a lockout key stored in the program-once memory for the protected memory sector.

In a further embodiment, the access control circuitry is further configured to receive a lockout request for a protectable memory sector, to receive a lockout code and a lockout key associated with the lockout request, and to write the lockout code and the lockout key into the program-once memory. Still further, the access control circuitry can be configured to deny the lockout request if the lockout code identifies a protectable memory sector that is already protected. In addition, the at least one protectable memory sector can include a plurality of protectable memory sectors. Further, the program-once memory area can be configured to store a plurality of lockout codes and a plurality of lockout keys. In addition, the access control circuitry can be configured to combine the plurality of lockout codes into a merged lockout code and to utilize the merged lockout code to control access to the protectable memory sectors. Still further, a protection register can be configured to store the merged lockout code.

In a further embodiment, the plurality of protectable sectors can be configured to store a protection code, and the protection code can be configured to identify at least one protected memory sector. Further, the access control circuitry can be configured to form the merged lockout code by combining the protection code with the plurality of lockout codes. Still further, the at least one protectable memory sector can be a plurality of protectable memory sectors; the at least one lockout code can be a plurality of protection bits; and each protection bit can be associated with one of the protectable memory sectors. In addition, the program-once memory area can be configured to store a single lockout code.

In one method embodiment, a method for protecting information stored in a non-volatile memory (NVM) system includes storing information within at least one protectable memory sector located within the NVM system where the at least one protectable memory sector has contents accessible through a read command to the NVM system, writing at least one lockout code to a program-once memory area located within the NVM system where the program-once memory area has contents not accessible through a read command to the NVM system and where the at least one lockout code identifies at least one protectable memory sector as a protected memory sector, and writing at least one lockout key associated with the lockout code to the program-once memory area, wherein the NVM system includes access control circuitry configured to receive a write access request for a protected memory sector and to allow write access to the protected memory sector only if a lockout code and a lockout key are received with the write access request that match the lockout code and the lockout key stored in the program-once memory for the protected memory sector.

In a further embodiment, the method can further include receiving a lockout request for a protectable memory sector and approving the lockout request prior to allowing the writing steps. In addition, the method can further include denying the lockout request if the lockout code identifies a protectable memory sector that is already protected. Further, the storing step can include storing information within a plurality of protectable memory sectors. Still further, the writing steps can include writing a plurality of lockout codes and writing a plurality of lockout keys to protect a plurality of protectable memory sectors. In addition, the access control circuitry can be further configured to combine the plurality of lockout codes into a merged lockout code. Further, the method can further include storing a protection code within the plurality of protectable sectors where the protection code is configured to identify at least one protected memory sector, and forming the merged lockout code by combining the protection code with the plurality of lockout codes.

In another method embodiment, a method for accessing protected information stored in a non-volatile memory (NVM) system includes operating a non-voltage memory (NVM) system having at least one protected memory sector and at least one program-once area where the at least one protected memory sector stores information to be protected and where the program-once memory area stores at least one lockout code that identifies the at least one protected memory sector and stores at least one lockout key associated with the lockout code. For this embodiment, the at least one protected memory sector is accessible through a read command to the NVM system, and the at least one program-once area is not accessible through a read command to the NVM system. Further, for this embodiment, the method also includes receiving a write access request for the protected memory sector, and allowing write access to the protected memory sector only if a lockout code and a lockout key are received with the write access that match the lockout code and the lockout key stored in the program-once memory for the protected memory sector.

In a further embodiment, the program-once area stores a plurality of lockout codes and associated lockout keys that identify a plurality of protected memory sectors, and the method further includes combining the plurality of lockout codes into a merged lockout code and utilizing the merged lockout code to control access to the protected memory sectors. In an additional embodiment, a protection code identifying at least one protected memory sector is also stored within the NVM system, and the method further includes forming the merged lockout code by combining the protection code with the plurality of lockout codes. Still further, the method can further include storing the merged lockout code in a protection register within the NVM system.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A non-volatile memory (NVM) system, comprising:
   a plurality of protectable memory sectors having contents accessible through a read command to the NVM system;
   a program-once memory area having contents not accessible through a read command received by the NVM system and being configured to store at least one lockout code and at least one lockout key, each of the at least one lockout key is associated with one of the at least one lockout code; and
   access control circuitry configured to receive a write access request for a requested protectable memory sector, and allow write access to the requested protectable memory sector in response to a combination of a first determination that a received lockout code received with the write access request matches a stored lockout code, wherein the stored lockout code is stored in the program-once memory area, the stored lockout code and the received lockout code each comprises a plurality of protection bits, each of the plurality of protection bits represents a respective sector of the plurality of protectable sectors, each of the plurality of protection bits having a respective logic value, a first protection bit of the received lockout code represents the requested protectable memory sector, the first protection bit of the received lockout code has a first logic value that indicates the requested protectable memory sector is a first protected memory sector, and
   all respective logic values of the received lockout code are determined to match all respective logic values of the stored lockout code, and
   a second determination that a received lockout key received with the write access request matches a stored lockout key associated with the stored lockout code, wherein the stored lockout key is stored in the program-once memory area.

2. The NVM system of claim 1, wherein the access control circuitry is further configured to receive a lockout request for a protectable memory sector, to receive a lockout code and a lockout key associated with the lockout request, and to write the lockout code and the lockout key into the program-once memory.

3. The NVM system of claim 2, wherein the access control circuitry is further configured to deny the lockout request if the lockout code identifies a protectable memory sector that is already protected.

4. The NVM system of claim 1, wherein the program-once memory area is configured to store a plurality of lockout codes and a plurality of lockout keys.

5. The NVM system of claim 4, wherein the access control circuitry is configured to combine the plurality of lockout codes into a merged lockout code and to utilize the merged lockout code to control access to the protectable memory sectors.

6. The NVM system of claim 5, further comprising a protection register configured to store the merged lockout code.

7. The NVM system of claim 5, wherein the plurality of protectable memory sectors are configured to store a protection code, the protection code being configured to identify at least one protected memory sector.

8. The NVM system of claim 7, wherein the access control circuitry is further configured to form the merged lockout code by combining the protection code with the plurality of lockout codes.

9. The NVM system of claim 1, wherein the program-once memory area is configured to store a single lockout code.

10. A method for protecting information stored in a non-volatile memory (NVM) system, comprising:
storing information within at least one of a plurality of protectable memory sectors located within the NVM system, the plurality of protectable memory sectors having contents accessible through a read command received by the NVM system;
writing at least one lockout code to a program-once memory area located within the NVM system, the program-once memory area having contents not accessible through a read command to the NVM system;
writing at least one lockout key to the program-once memory area, wherein each of the at least one lockout key is associated with one of the at least one lockout code;
receiving a write access request for a requested protectable memory sector;
allowing write access to the requested protectable memory sector in response to a combination of a first determination that a received lockout code received with the write access request matches a stored lockout code, wherein the stored lockout code is stored in the program-once memory area,
the stored lockout code and the received lockout code each comprises a plurality of protection bits, each of the plurality of protection bits represents a respective sector of the plurality of protectable sectors, each of the plurality of protection bits having a respective logic value, a first protection bit of the received lockout code represents the requested protectable memory sector, the first protection bit of the received lockout code has a first logic value that indicates the requested protectable memory sector is a first protected memory sector, and
all respective logic values of the received lockout code are determined to match all respective logic values of the stored lockout code, and
identify a set of one or more protectable memory sectors as a set of one or more protected memory sectors, each protection bit is associated with one of the protected memory sectors, and
the set of one or more protected memory sectors includes the requested protected memory sector, and
a second determination that a received lockout key received with the write access request matches a stored lockout key associated with the stored lockout code, wherein the stored lockout key is stored in the program-once memory area, and
wherein the NVM system includes access control circuitry configured to perform the receiving the write access request for the protected memory sector and the allowing write access to the protected memory sector.

11. The method of claim 10, further comprising receiving a lockout request for a protectable memory sector and approving the lockout request prior to allowing the writing steps.

12. The method of claim 11, further comprising denying the lockout request if the lockout code identifies a protectable memory sector that is already protected.

13. The method of claim 10, wherein the writing steps comprise writing a plurality of lockout codes and writing a plurality of lockout keys to protect ones of the plurality of protectable memory sectors.

14. The method of claim 13, wherein the access control circuitry is further configured to combine the plurality of lockout codes into a merged lockout code.

15. The method of claim 14, further comprising storing a protection code within the plurality of protectable memory sectors, the protection code identifying at least one protected memory sector, and forming the merged lockout code by combining the protection code with the plurality of lockout codes.

16. A method for accessing protected information stored in a non-volatile memory (NVM) system, comprising:
operating a non-voltage memory (NVM) system having a plurality of protectable memory sectors and at least one program-once memory area, the plurality of protectable memory sectors storing information, and the program-once memory area storing at least one lockout code and storing at least one lockout key, each of the at least one lockout key is associated with one of the at least one lockout code, wherein the plurality of protectable memory sectors is accessible through a read command to the NVM system and the at least one program-once area is not accessible through a read command received by the NVM system;
receiving a write access request for a requested protectable memory sector;
and allowing write access to the requested protectable memory sector in response to a combination of a first determination that a received lockout code received with the write access matches a stored lockout code, wherein the stored lockout code is stored in the program-once memory area, the stored lockout code and the received lockout code each comprises a plurality of protection bits, each of the plurality of protection bits represents a respective sector of the plurality of protectable sectors, each of the plurality of protection bits having a respective logic value,
a first protection bit of the received lockout code represents the requested protectable memory sector, the first protection bit of the received lockout code has a first logic value that indicates the requested protectable memory sector is a first protected memory sector, and
all respective logic values of the received lockout code are determined to match all respective logic values of the stored lockout code, and
a second determination that a received lockout key received with the write access request matches a stored lockout key associated with the stored lockout code, wherein the stored lockout key is stored in the program-once memory area.

17. The method of claim 16, wherein the program-once memory area stores a plurality of lockout codes and associated lockout keys that identify ones of the plurality of protectable memory sectors as protected memory sectors, and further comprising combining the plurality of lockout codes into a merged lockout code and utilizing the merged lockout code to control access to the protected memory sectors.

18. The method of claim 17, wherein a protection code identifying at least one protected memory sector is also stored within the NVM system, and further comprising forming the merged lockout code by combining the protection code with the plurality of lockout codes.

19. The method of claim 17, wherein the plurality of lockout codes comprises a first lockout code and a second lockout code, the first lockout code comprises one or more first protection bits that identify a first set of protectable memory sectors as a first set of protected memory sectors, the second lockout code comprises one or more second protection bits that identify a second set of protectable memory sectors as a second set of protected memory sectors, and the merged lockout code comprises the first protection bits and the second protection bits that respectively identify the first and second sets of protected memory sectors.

20. The non-volatile memory (NVM) system of claim 1, wherein a second protection bit of the received lockout code corresponds to a second protectable memory sector, and the second protection bit of the received lockout code has the first logic value that indicates the second protectable memory sector is a second protected memory sector.

21. The non-volatile memory (NVM) system of claim 20, wherein the requested protectable memory sector and the second protectable memory sector are included in a set of protected memory sectors that were protected by a first vendor, the stored lockout code includes a subset of the plurality of protection bits that each correspond to one of the set of protected memory sectors, each of the subset of the plurality of protection bits have the first logic value, and remaining ones of the plurality of protection bits have a default logic value different from the first logic value, and access to any one of the set of protected memory sectors requires receipt of a lockout code that matches the stored lockout code.

22. The non-volatile memory (NVM) system of claim 21, wherein the stored lockout code includes a third protection bit that corresponds to a third protectable memory sector, the third protection bit having the default logic value that indicates the first vendor did not protect the third protectable memory sector, a second stored lockout code includes a fourth protection bit that corresponds to the third protectable memory sector, the fourth protection bit has the first logic value indicating that the third protectable memory sector is a third protected memory sector, and the third protected memory sector was protected by a second vendor.

* * * * *